US012705590B2

(12) United States Patent
Qi et al.

(10) Patent No.: US 12,705,590 B2
(45) Date of Patent: Aug. 11, 2026

(54) PAYMENT METHOD, GATEWAY DEVICE, SERVER AND STORAGE MEDIUM

(71) Applicant: CHINA UNIONPAY CO., LTD., Shanghai (CN)

(72) Inventors: Wenbin Qi, Shanghai (CN); Zhijie Xu, Shanghai (CN); Weiqi Yu, Shanghai (CN); Sishuang Wan, Shanghai (CN); Qi Zhang, Shanghai (CN); Teng Hou, Shanghai (CN)

(73) Assignee: CHINA UNIONPAY CO., LTD., Shanghai (CN)

( * ) Notice: Subject to any disclaimer, the term of this patent is extended or adjusted under 35 U.S.C. 154(b) by 0 days.

(21) Appl. No.: 17/924,341

(22) PCT Filed: Sep. 18, 2021

(86) PCT No.: PCT/CN2021/119364
§ 371 (c)(1),
(2) Date: Nov. 9, 2022

(87) PCT Pub. No.: WO2022/156253
PCT Pub. Date: Jul. 28, 2022

(65) Prior Publication Data

US 2023/0186257 A1 Jun. 15, 2023

(30) Foreign Application Priority Data

Jan. 22, 2021 (CN) ......................... 202110091231.8

(51) Int. Cl.
*G06Q 20/08* (2012.01)
*G06Q 20/02* (2012.01)
(Continued)

(52) U.S. Cl.
CPC ....... *G06Q 20/0855* (2013.01); *G06Q 20/027* (2013.01); *G06Q 20/308* (2020.05); *G06Q 20/4014* (2013.01)

(58) Field of Classification Search
CPC ............. G06Q 20/0855; G06Q 20/308; G06Q 20/027; G06Q 20/4014; G06Q 30/0601;
(Continued)

(56) References Cited

U.S. PATENT DOCUMENTS 10,210,498 B1 * 2/2019 Meyyappan ........... G06Q 20/40
2016/0205106 A1 * 7/2016 Yacoub ............... H04W 12/041
726/28

(Continued)

FOREIGN PATENT DOCUMENTS

CN 106204025 A 12/2016
CN 107507003 A 12/2017

(Continued)

OTHER PUBLICATIONS

T. Ali and M. A. Awal, "Secure mobile communication in m-payment system using NFC technology," 2012 International Conference on Informatics, Electronics & Vision (ICIEV), Dhaka, Bangladesh, 2012, pp. 133-136, doi: 10.1109/ICIEV.2012.6317453. (Year: 2012).*

(Continued)

*Primary Examiner* — Ryan D Donlon
*Assistant Examiner* — Steven R Chism
(74) *Attorney, Agent, or Firm* — ANOVA LAW GROUP, PLLC

(57) ABSTRACT

Embodiments of the present application provide a payment method, a gateway device, a server and a storage medium. The method is applied to the gateway device, and the method includes: obtaining target identification information and payment amount of a target IoT device connected to the
(Continued)

gateway device, wherein the target identification information includes a first device identification of the target IoT device and/or a feature identification of a physical layer between the target IoT device and the gateway device; sending a first payment request to the server, wherein the first payment request includes the target identification information, a second device identification of the gateway device and the payment amount, and the first payment request is configured to instruct the server to search a target payment account associated with the target identification information and the second device identification, and to deduct from the target payment account according to the payment amount.

8 Claims, 3 Drawing Sheets

(51) Int. Cl.
*G06Q 20/30* (2012.01)
*G06Q 20/40* (2012.01)

(58) Field of Classification Search
CPC .. G06Q 20/401; G06Q 20/102; G06Q 20/382; G06Q 30/0267; G06Q 20/321; G06Q 30/0222; H04L 61/5007; H04L 63/18; H04L 12/2803; H04L 12/4633; H04L 67/01; H04L 12/2816; H04L 2101/622
See application file for complete search history.

(56) References Cited

U.S. PATENT DOCUMENTS

2016/0283933 A1* 9/2016 Orlando ............... G06Q 20/204
2018/0091506 A1* 3/2018 Chow ................... H04L 67/567
2019/0020718 A1* 1/2019 Mathews ................ H04L 67/55
2019/0026716 A1* 1/2019 Anbukkarasu ....... G06Q 20/308
2020/0203027 A1* 6/2020 Gawda .................... H04L 63/12
2022/0292482 A1* 9/2022 Hamdan .............. G06Q 20/409
2022/0309502 A1* 9/2022 Ortiz .................... G06Q 20/202

FOREIGN PATENT DOCUMENTS

CN 108764919 A 11/2018
CN 109087109 A 12/2018
CN 109615366 A 4/2019
CN 110298652 A 10/2019
CN 111553667 A 8/2020
CN 111738729 A 10/2020
CN 112819454 A 5/2021
TW 201351313 A 12/2013
TW 201828179 A 8/2018
TW 201941134 A 10/2019
WO WO 2017/091431 A1 6/2017

OTHER PUBLICATIONS

I. Makhdoom, M. Abolhasan, J. Lipman, R. P. Liu and W. Ni, "Anatomy of Threats to the Internet of Things," in IEEE Communications Surveys & Tutorials, vol. 21, No. 2, pp. 1636-1675, Secondquarter 2019, doi: 10.1109/COMST.2018.2874978 (Year: 2019).*

International Search Report and Written Opinion issued on Dec. 16, 2021 for International PCT application No. PCT/CN2021/119364.

The First Office Action issued on Oct. 7, 2022 for Taiwanese Patent Application No. 110142443.

Office Action issued on Jul. 29, 2023 by China National Intellectual Property Administration in connection with Chinese Patent Application No. 202110091231.8.

* cited by examiner

PAYMENT METHOD, GATEWAY DEVICE, SERVER AND STORAGE MEDIUM

CROSS-REFERENCE TO RELATED APPLICATION

This application is a National Stage of International Application No. PCT/CN2021/119364 filed on Sep. 18, 2021, which claims priority to Chinese patent application No. 202110091231.8 entitled "PAYMENT METHOD, GATEWAY DEVICE, SERVER AND STORAGE MEDIUM" and filed on Jan. 22, 2021, both of which are hereby incorporated by reference in their entireties.

TECHNICAL FIELD

The present application relates to the technical field of internet of things, and particularly to a payment method, a gateway device, a server and a storage medium.

BACKGROUND

With the rapid development of internet of things (IoT) technology, payment scenarios for IoT devices are becoming more and more common. A conventional payment solution is usually to bind a payment account to the gateway device, and use a gateway device to uniformly process payment tasks of all IoT devices connected to the gateway.

However, due to a strong binding relationship between the payment account and the gateway device, payment can be performed by any device connected to the gateway device. The conventional payment solution is prone to a problem of malicious access to the device for stealing, so security is not high.

SUMMARY

Embodiments of the present application provide a payment method, a gateway device, a server, and a storage medium.

In a first aspect, an embodiment of the present application provides a payment method applied to a gateway device, the payment method includes:

obtaining target identification information and payment amount of a target internet of things (IoT) device connected to the gateway device, and the target identification information includes a first device identification of the target IoT device and/or a feature identification of a physical layer between the target IoT device and the gateway device;

sending a first payment request to a server, and the first payment request includes the target identification information, a second device identification of the gateway device and the payment amount, and the first payment request is configured to instruct the server to search a target payment account associated with the target identification information and the second device identification, and to deduct from the target payment account according to the payment amount.

In a second aspect, an embodiment of the present application provides a payment method applied to a server, the payment method includes:

receiving a first payment request sent by a gateway device, and the first payment request includes target identification information and payment amount of a target internet of things (IoT) device, as well as a second device identification of the gateway device, and the target identification information includes a first identification of the target IoT device and/or a feature identification of a physical layer between the target IoT device and the gateway device;

searching a target payment account associated with the target identification information and the second device identification; and deducting from the target payment account according to the payment amount.

In a third aspect, an embodiment of the present application provides a gateway device, the gateway device includes:

an obtaining module configured to obtain target identification information and payment amount of a target internet of things (IoT) device connected to the gateway device, and the target identification information includes a first device identification of the target IoT device and/or a feature identification of a physical layer between the target IoT device and the gateway device; and a sending module configured to send a first payment request to a server, and the first payment request includes the target identification information, a second device identification of the gateway device and the payment amount, and the first payment request is configured to instruct the server to search a target payment account associated with the target identification information and the second device identification, and to deduct from the target payment account according to the payment amount.

In a fourth aspect, an embodiment of the present application provides a server, the server includes:

a receiving module configured to receive a first payment request sent by a gateway device, and the first payment request includes target identification information and payment amount of a target internet of things (IoT) device, as well as a second device identification of the gateway device, and the target identification information includes a first device identification of the target IoT device and/or a feature identification of a physical layer between the target IoT device and the gateway device;

a searching module configured to search a target payment account associated with the target identification information and the second device identification; and a deducting module configured to deduct from the target payment account according to the payment amount.

In a fifth aspect, an embodiment of the present application provides a payment device, the device includes: a processor and a memory storing computer program instructions; wherein the computer program instructions, when executed by the processor, implement the payment method described in the first aspect or the payment method described in the second aspect.

In a sixth aspect, an embodiment of the present application provides a computer-readable storage medium having computer program instructions stored thereon, wherein the computer program instructions, when executed by a processor, implement the payment method described in the first aspect or the payment method described in the second aspect.

BRIEF DESCRIPTION OF THE DRAWINGS

The drawings necessary for explaining the embodiments are introduced briefly below to illustrate more clearly the technical solutions of the embodiments of the present application; and for those with ordinary skills in the field, they can obtain other figures from those drawings without any creative work.

DETAILED DESCRIPTION

Figure 1:
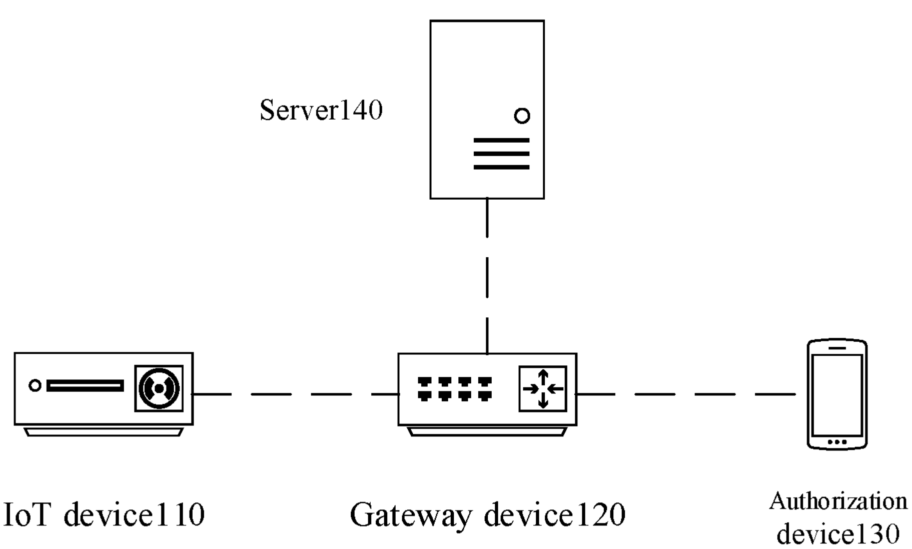
FIG. 1 is a schematic structural view of a payment system related to the present application.

The features and exemplary embodiments of various aspects of the present application will be described in detail below. In order to make the purpose, technical solutions and advantages of the present application more clear, the present application will be further described in detail below with reference to the accompanying drawings and specific embodiments. It should be understood that the specific embodiments described herein are only intended to explain the present application, but not to limit the present application. It will be apparent to a person skilled in the art that the present application can be practiced without some of these specific details. The following description of the embodiments is merely to provide a better understanding of the present application by illustrating examples of the present application.

It should be noted that, in this document, relational terms such as first and second are used only to distinguish one entity or operation from another entity or operation, and do not necessarily require or imply such actual relationship or sequence between these entities or operations Moreover, the terms "comprising", "including", or any other variation thereof, are intended to encompass a non-exclusive inclusion, such that a process, method, article or device that includes a list of elements includes not only these elements, but also includes other elements that are not explicitly listed but inherent to such a process, method, article or device. Without further limitation, an element defined by the term "comprising . . . " does not preclude presence of additional elements in a process, method, article or device that includes the element.

In order to solve the problems of the prior art, embodiments of the present application provide a payment method, a gateway device, a server, and a storage medium. The gateway device can obtain target identification information and payment amount of a target IoT device connected to the gateway device, wherein the target identification information includes a first device identification of the target IoT device and/or a feature identification of a physical layer between the target IoT device and the gateway device. Then, a first payment request is sent to the server, and the first payment request includes the target identification information, the second device identification of the gateway device and the payment amount. The server searches a target payment account associated with the target identification information and the second device identification, and deducts from the target payment account according to the payment amount. In this way, deduction from a target payment account associated with both target identification information of a target IoT device and a second device identification of a gateway device can be implemented, thereby improving payment security. At the same time, different target IoT devices deducting from different payment accounts can be implemented.

The payment method, the gateway device, the server, and the storage medium according to the embodiments of the present application will be described in detail below with reference to the accompanying drawings through specific embodiments and application scenarios thereof.

As an example, the payment method can be applied to IoT scenarios such as smart homes, smart factories, or smart hospitals, which are not limited here.

FIG. 1 is a schematic structural view of a payment system related to the present application. As shown in FIG. 1, the payment system can include an IoT device 110, a gateway device 120, an authorization device 130 and a server 140. The IoT device 110 can be an IoT device which has a payment requirement, such as a TV set-top box, a smart socket, or a webcam. The gateway device 120 can be a gateway device that communicates with the public network, such as a router or a base station, and the base station can be a 4G or 5G base station. The authorization device 130 can be a device to which a payment account has been bound, or a device with a payment account to which an installed APP has been bound, such as a mobile phone, a tablet computer, or a laptop computer, and so on. The server 140 can be a high performance electronic computing device for storing and processing data. Optionally, the IoT device 110 can communicate with the gateway device 120, and the gateway device 120 can communicate with the authorization device 130 and the server 140 by Bluetooth, Ultra Wide Band (UWB), Universal Serial Bus (USB), serial, network cable, WiFi, or transfer through other devices.

With reference to FIG. 1, when at least one IoT device 110 exists, the gateway device 120 can obtain target identification information and payment amount of a target IoT device. The target IoT device is the IoT device 110 participating in payment. The target identification information includes a first device identification of the target IoT device and/or a feature identification of a physical layer between the target IoT device and the gateway device 120. Then, a first payment request is sent to the server 140, wherein the first payment request includes the target identification information, a second device identification of the gateway device 120 and the payment amount. The server 140 can search a target payment account associated with the target identification information and the second device identification, and can deduct from the target payment account according to the payment amount.

Exemplarily, before obtaining the target identification information and the payment amount of the target IoT device, the gateway device 120 can obtain the identification information of at least one IoT device 110. At least one IoT device 110 includes the target IoT device, and the identification information includes a device identification of the IoT device and/or a feature identification of a physical layer between the at least one IoT device and the gateway device. A first authorization request is sent to the authorization device 130. The first authorization request includes identification information. The authorization device 130 can generate an authorization identification according to the identification information, and send the authorization identification to the gateway device 120. The authorization identification corresponds to the payment account of the authorization device 130. The gateway device 120 can send a second authorization request to the server 140. The second authorization request includes the identification information, the second device identification and the authorization identification. The server 140 stores and associates the identification information, the second device identification and the payment account corresponding to the authorization identification, so as to implement payment authorization.

The payment method according to the embodiments of the present application will be described in detail below. The payment method can be applied to the payment system shown in FIG. 1.

Figure 2:
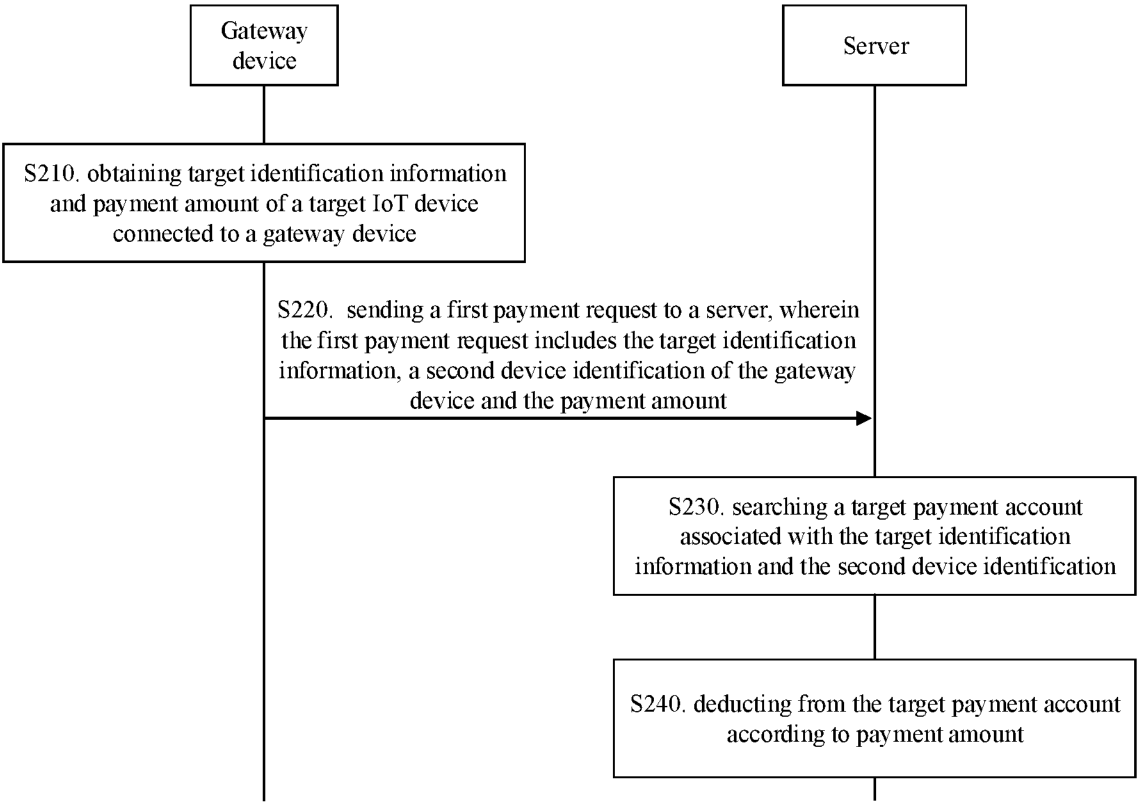
FIG. 2 is a schematic flowchart of an embodiment of a payment method related to the present application.

FIG. 2 is a schematic flowchart of an embodiment of a payment method related to the present application. As shown in FIG. 2, the payment method can include steps below:

S210, the gateway device obtains the target identification information and the payment amount of the target IoT device connected to the gateway device.

The target IoT device is the IoT device participating in the payment, the target identification information includes the first device identification of the target IoT device and/or the feature identification of the physical layer between the target IoT device and the gateway device. Optionally, the first device identification can be preset when the target IoT device leaves a factory, or can be delivered in an encrypted way subsequently, and can uniquely represent an identity of the target IoT device. The feature identification of the physical layer between the target IoT device and the gateway device can uniquely represent a communication link between the target IoT device and the gateway device, which does not leak easily and has high security. The payment amount can be charges produced when the target IoT device is used, such as electricity charges produced when the smart socket is used for a period of time.

Optionally, the gateway device can receive a second payment request sent by the target IoT device, the second payment request includes the target identification information and the payment amount. Exemplarily, under a condition that the target identification information includes the feature identification, the target IoT device can obtain the feature information of the physical layer between the target IoT device and the gateway device. The feature information can include at least one of a channel feature, a radio frequency fingerprint and a radio frequency watermark. Then, the feature identification is generated according to the feature information. Specifically, information conversion can be performed on the feature information to obtain the feature identification. Next, the second payment request is sent to the gateway device, the second payment request includes the feature identification and the payment amount. In this way, computing resources of the target IoT device can be fully utilized to obtain the feature identification, which is convenient for subsequent processing by the gateway device.

Optionally, under a condition that the target identification information includes the feature identification, the gateway device can receive a third payment request sent by the target IoT device. The third payment request includes the payment amount. In response to the third payment request, the gateway device obtains the feature information of the physical layer between the target IoT device and the gateway device. The feature identification is generated according to the feature information. In this way, the computing resources of the gateway device can be fully utilized to obtain the feature identification, which reduces computing pressure of the target IoT device, thereby lightening weight of the IoT device and reducing the cost of the device.

As shown in FIG. 2, the payment method can further include: S220, the gateway device sends a first payment request to the server.

The first payment request includes the target identification information and the payment amount, the second device identification of the gateway device. Optionally, the second device identification can be preset when the target IoT device leaves the factory, or can be delivered in an encrypted way subsequently, and can uniquely represent the identity of the target IoT device.

As shown in FIG. 2, the payment method can further include: S230, the server searches the target payment account associated with the target identification information and the second device identification.

Specifically, the server can receive the first payment request, and perform legality authentication, that is, identity authentication, on the second device identification in the first payment request. Under a condition that the authentication is passed, the target payment account associated with the target identification information and the second device identification is searched. In this way, the payment security can be further improved.

Exemplarily, the server can search a target associated relationship between the target identification information and the second device identification from a preset registry, and the registry includes at least one associated relationship. The associated relationship represents the association of the identification information of the IoT device, the second device identification of the gateway device and the payment account. The target associated relationship represents the association of the target identification information, the second device identification and the target payment account. Further, the target payment account is determined according to the target associated relationship.

As shown in FIG. 2, the payment method can further include: S240, the server deducts from the target payment account according to the payment amount.

Specifically, the server can deduct from the target payment account and generate a transaction result, and then send the transaction result to the gateway device. The gateway device receives the transaction result and sends the transaction result to the target IoT device.

In the embodiments of the present application, the gateway device can obtain target identification information and payment amount of a target IoT device connected to the gateway device, and the target identification information includes the first device identification of the target IoT device and/or the feature identification of the physical layer between the target IoT device and the gateway device. Then, the first payment request is sent to the server, and the first payment request includes the target identification information, the second device identification of the gateway device and the payment amount. The server searches the target payment account associated with the target identification information and the second device identification, and deducts from the target payment account according to the payment amount. In this way, deduction from the target payment account associated with both the target identification information of the target IoT device and the second device identification of the gateway device can be implemented, thereby improving the payment security. At the same time, different target IoT devices deducting from different payment accounts can be implemented, which meets needs of different IoT devices to deduct from different payment accounts, and such needs can be seen in in a dormitory, a shared apartment and other scenarios.

At present, the payment authorization can be performed by manually entering a card number or cross-screen scanning. The method of manually entering the card number requires a user to memorize a lengthy card number, which brings inconvenience; the cross-screen scanning method is not suitable for a device having no screen.

Therefore, in one embodiment, before obtaining the target identification information and the payment amount of the target IoT device connected to the gateway device, the gateway device can obtain the identification information of at least one IoT device connected to the gateway device. At least one IoT device includes the target IoT device, and the identification information includes the device identification of the at least one IoT device and/or the feature identification of the physical layer between the at least one IoT device and the gateway device. Then, the first authorization request is sent to the authorization device. The first authorization request includes the identification information.

Exemplarily, in a situation that the IoT device accesses the gateway device for the first time, the gateway device can obtain the identification information of the IoT device. Specifically, the gateway device can also receive the identification information sent by the target IoT device. Alternatively, under a condition that the identification information includes the feature identification, the gateway device can obtain the feature information of the physical layer between the IoT device and the gateway device, and generate the feature identification according to the feature information. The specific details are similar to those of S210, and are not repeated here. Then, the feature identification is stored in a specified storage area in the gateway device by using a trusted execution environment (TEE) or a security chip in the IoT device. In a situation that the authorization device accesses the gateway device, the first authorization request is sent to the authorization device. Alternatively, an obtaining request sent by the authorization device is received, and the first authorization request is sent to the authorization device in response to the obtaining request.

The authorization device can receive the first authorization request and generate an authorization identification according to the identification information in the first authorization request, and then send the authorization identification to the gateway device, the authorization identification corresponds to the payment account of the authorization device.

Exemplarily, the authorization device can display the identification information so that the user can search it, to determine whether the IoT device corresponding to the identification information is authorized according to the identification information. Under a condition that the user determines the authorization, the user can enter confirming information to the authorization device, for example, clicking a target control in a display interface of the authorization device. In response to the confirming information entered by the user, the authorization device can generate the authorization identification, and send the authorization identification to the gateway device. Under a condition that the user refuses the authorization, the user can enter refusing information to the authorization device, or can ignore the identification information. At this point, the authorization device cannot generate the authorization identification.

The gateway device can receive the authorization identification and send the second authorization request to the server. The second authorization request includes the identification information, the second device identification and the authorization identification.

The server can receive the second authorization request, and can store and associate the identification information, the second device identification and the payment account corresponding to the authorization identification. Specifically, the authorization device can perform the legality authentication, that is, the identity authentication, on the second device identification and the authorization identification. Under a condition that authentication is passed, the identification information, the second device identification and the authorization identification are stored and associated to implement the payment authorization. In this way, reliability of the payment authorization can be further improved through the legality authentication.

Exemplarily, the server can associate the payment account corresponding to the identification information, the second device identification and the authorization identification to obtain the associated relationship, and store the associated relationship in an association table under a file directory specified by the server, and send an authorization success notification to the gateway device.

In this way, the identification information of the IoT device and the second device identification of the gateway device can be associated with the payment account of the authorization device, so as to implement the payment authorization in a quick manner, which reduces the time required for the payment authorization, thereby avoiding leakage of private information. At the same time, association of different target IoT devices with different payment accounts can be implemented.

Optionally, before obtaining the target identification information and the payment amount of the target IoT device connected to the gateway device, the gateway device can obtain the identification information of at least one IoT device connected to the gateway device. Then, a third authorization request is sent to the authorization device. The third authorization request includes the identification information and the second device identification.

The authorization device can receive the third authorization request and generate an authorization identification according to the identification information in the third authorization request, and then send a fourth authorization request to the server. The fourth authorization request includes the identification information, the second device identification and the authorization identification.

The server can receive the fourth authorization request, and can store and associate the identification information, the second device identification and the payment account corresponding to the authorization identification.

Figure 3:
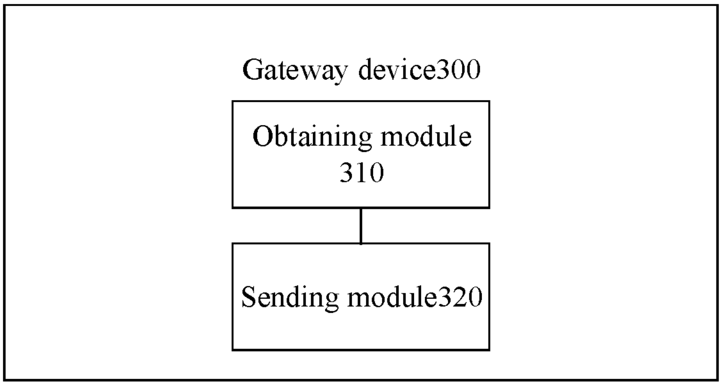
FIG. 3 is a schematic structural view of an embodiment of a gateway device related to the present application.

Based on the payment method according to the embodiment of the present application, an embodiment of the present application further provides a gateway device. As shown in FIG. 3, a gateway device 300 can include an obtaining module 310 and a sending module 320.

The obtaining module 310 is configured to obtain the target identification information and the payment amount of a target IoT device connected to the gateway device, and the target identification information includes a first device identification of the target IoT device and/or a feature identification of a physical layer between the target IoT device and the gateway device.

The sending module 320 is configured to send a first payment request to a server. The first payment request includes the target identification information, a second device identification of the gateway device and the payment amount, and the first payment request is configured to instruct the server to search the target payment account associated with the target identification information and the second device identification, and to deduct from the target payment account according to the payment amount.

In one embodiment, the obtaining module 310 includes:

a first receiving unit, configured to receive a second payment request sent by the target IoT device, and the second payment request includes the target identification information and the payment amount.

In one embodiment, the obtaining module 310 includes:

a second receiving unit, configured to receive a third payment request sent by the target IoT device under a condition that the target identification information includes the feature identification, and the third payment request includes the payment amount;

an obtaining unit, configured to obtain feature information of the physical layer between the target IoT device and the gateway device; and a generating unit, configured to generate the feature identification according to the feature information.

In one embodiment, the feature information includes at least one of a channel feature, a radio frequency fingerprint and a radio frequency watermark.

In one embodiment, the obtaining module 310 is further configured to obtain identification information of at least one IoT device connected to the gateway device before obtaining the target identification information and the payment amount of the target IoT device connected to the gateway device, wherein the at least one IoT device includes the target IoT device, and the identification information includes the device identification of the at least one IoT device and/or the feature identification of the physical layer between the at least one IoT device and the gateway device.

The sending module 320 can be further configured to send the first authorization request to the authorization device, and the first authorization request includes the identification information, and the first authorization request is configured to instruct the authorization device to generate the authorization identification according to the identification information, and the authorization identification corresponds to the payment account of the authorization device.

The gateway device 300 further includes a receiving module configured to receive the authorization identification sent by the authorization device.

The sending module 320 is further configured to send the second authorization request to the server, and the second authorization request includes the identification information, the second device identification and the authorization identification, and the second authorization request is configured to instruct the server to store and associate the identification information, the second device identification and the payment account corresponding to the authorization identification.

It can be understood that each module/unit of the gateway device 300 shown in FIG. 3 has a function of implementing each step performed by the gateway device in FIG. 2 and can achieve its corresponding technical effect. For brevity, each module/unit is not repeated here.

Figure 4:
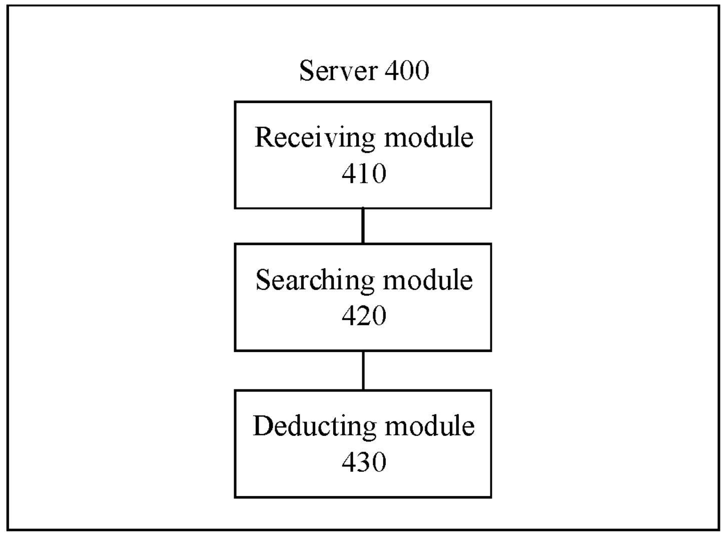
FIG. 4 is a schematic structural view of an embodiment of a server related to the present application.

Based on the payment method according to the embodiment of the present application, an embodiment of the present application further provides a server. As shown in FIG. 4, a server 400 may include a receiving module 410, a searching module 420 and a deducting module 430.

The receiving module 410 is configured to receive the first payment request sent by the gateway device. The first payment request includes the target identification information and the payment amount of the target IoT device, as well as the second device identification of the gateway device, and the target identification information includes the first device identification of the target IoT device and/or the feature identification of the physical layer between the target IoT device and the gateway device.

A searching module 420 is configured to search a target payment account associated with the target identification information and the second device identification.

A deducting module 430 is configured to deduct from the target payment account according to the payment amount.

In one embodiment, the searching module 420 includes:

a first authenticating unit, configured to perform the legality authentication on the second device identification; and a searching unit, configured to search the target payment account associated with the target identification information and the second device identification under a condition that the authentication is passed.

In one embodiment, the receiving module 410 is further configured to receive the second authorization request sent by the gateway device before receiving the first payment request sent by the gateway device, and the second authorization request includes the identification information of at least one IoT device, the second device identification and the authorization identification, and the identification information includes the device identification of the at least one IoT device and/or the feature identification of the physical layer between the IoT device and the gateway device, and the authorization identification is generated by the authorization device according to the identification information, and the authorization identification corresponds to the payment account of the authorization device.

The server 400 can further include a storing module configured to store and associate the identification information, the second device identification and the payment account corresponding to the authorization identification.

In one embodiment, the storing module includes:

a second authenticating unit configured to perform the legality authentication on the second device identification and the authorization identification;

a storing unit configured to store and associate the identification information, the second device identification and the payment account corresponding to the authorization identification under a condition that authentication is passed.

It can be understood that each module/unit of the server 400 shown in FIG. 4 has a function of implementing each step performed by the server in FIG. 2 and can achieve its corresponding technical effect. For brevity, each module/unit is not repeated here.

Figure 5:
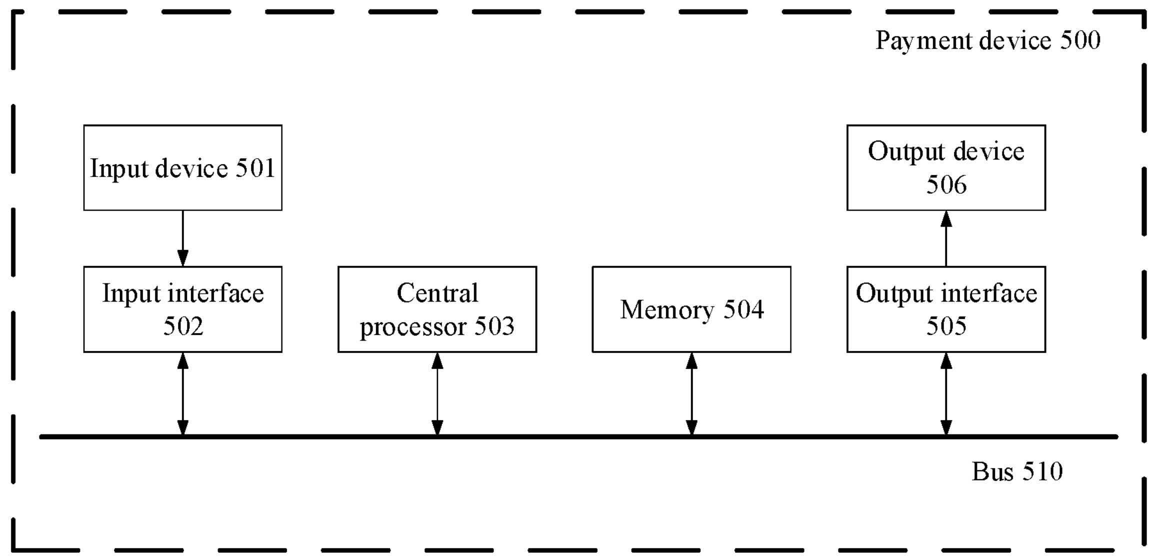
FIG. 5 is a schematic structural view of an embodiment of a payment device related to the present application.

FIG. 5 is a schematic structural view of an embodiment of a payment device related to the present application.

As shown in FIG. 5, a payment device 500 in this embodiment includes an input device 501, an input interface 502, a central processing unit 503, a memory 504, an output interface 505, and an output device 506. The input interface 502, the central processing unit 503, the memory 504, and the output interface 505 are connected to each other through the bus 510, and the input device 501 and the output device 506 are connected to the bus 510 through the input interface 502 and the output interface 505, respectively, and thus connected to other components of the payment device 500.

Specifically, the input device 501 receives input information from the outside, and sends the input information to the central processor 503 through the input interface 502; the central processor 503 processes the input information based on computer-executable instructions stored in the memory 504 to generate output information, and temporarily or permanently stores the output information in the memory 504, and then sends the output information to the output device 506 through the output interface 505; the output device 506 outputs the output information to the outside of the payment device 500 for the user to use.

In one embodiment, the payment device 500 shown in FIG. 5 includes the memory 504 for storing a program, and the processor 503 for running the program stored in the memory to implement the payment method according to the embodiment of the present application.

An embodiment of the present application further provides a computer-readable storage medium, computer program instructions are stored on the computer-readable storage medium; when the computer program instructions are executed by the processor, the payment method according to the embodiment of the present application is implemented. An example of the computer-readable storage medium includes a non-transitory computer-readable storage medium, such as a read-only memory (ROM), a random access memory (RAM), a magnetic disk or an optical disk and the like.

It should be clear that embodiments in this specification is described in a progressive manner, and the same or similar parts between the embodiments can be referred to each other, and for the sake of brevity, details are not repeated. The present application is not limited to the specific configuration and processing described above and shown in the figures. For the sake of brevity, a detailed description of the known method is omitted here. In the above embodiments, several specific steps are described and shown as examples. However, the method process of the present application is not limited to the specific steps described and shown, and those skilled in the art can make various changes, modifications and additions, or change the sequence of steps after comprehending the gist of the present application.

The functional blocks shown in the structural block diagrams above can be implemented as hardware, software, firmware, or a combination thereof. When implemented in hardware, it can be, for example, an electronic circuit, an application specific integrated circuit (ASIC), suitable firmware, a plug-in, a functional card, and the like. When implemented as software, elements of the present application are programs or code segments used to perform required tasks. The programs or code segments can be stored in a machine-readable medium, or transmitted on a transmission medium or a communication link through a data signal carried in a carrier wave. A "machine-readable medium" can include any medium that can store or transmit information. An example of the machine-readable media includes an electronic circuit, a semiconductor memory device, a Read-Only Memory (ROM), a flash memory, an erasable ROM (EROM), a floppy disk, a CD-ROM, an optical disk, a hard disk, a fiber optic medium, a radio frequency (RF) link, and the like. The code segments can be downloaded via a computer network such as the Internet, intranet, and the like.

It should also be noted that, according to the exemplary embodiments described in the present application, some methods or systems are described based on a series of steps or apparatuses. However, the present application is not limited to the above order of the steps, that is, the steps can be executed in the order described in the embodiments or in orders different from that in the embodiments, or several steps can be executed at the same time.

Aspects of the present disclosure are described above with reference to flowchart illustrations and/or block diagrams of methods, apparatuses (systems) and computer program products according to the embodiments of the present application. It should be understood that the flowchart illustrations and/or each block of the block diagrams, and a combination of the flowchart illustrations and/or the blocks of the block diagrams can be implemented by the computer program instructions. These computer program instructions can be provided to a processor of a general purpose computer, special purpose computer, or other programmable data processing apparatus to produce a machine such that execution of the instructions via the processor of the computer or other programmable data processing apparatus enables the implementation of the functions/acts specified in the flowchart illustrations and/or one or more blocks of block diagrams. Such processor can be but is not limited to a general purpose processor, a special purpose processor, an application specific processor, or a field programmable logic circuit. It should also be understood that each block of the block diagrams and/or the flowchart illustrations, and the combination of blocks of the block diagrams and/or the flowchart illustrations can also be implemented by special purpose hardware that performs specified functions or actions, or by the combination of the special purpose hardware and computer instructions.

The above are only specific implementations of the present application, those skilled in the art can clearly understand that the specific working processes of the above systems, modules and units can be referred to the corresponding processes in the foregoing method embodiments for the convenience and brevity of the description, which is not repeated here. It should be understood that the protection scope of the present application is not limited to this, and any person skilled in the art can easily think of various equivalent modifications or replacements within the technical scope disclosed in the present application, and these modifications or replacements should all be covered within the scope of protection of the present application.

What is claimed is:

1. An online payment method applied to a gateway device in an online payment system including the gateway device, at least one Internet of Things (IoT) device connected to the gateway device, a server, and an authorization device of a user, comprising:

obtaining identification information of the at least one Internet of Things (IoT) device connected to the gateway device, wherein the identification information comprises a device identification of the at least one IoT device, a feature identification of a physical layer between the at least one IoT device and the gateway device, or the device identification of the at least one IoT device and the feature identification of the physical layer between the at least one IoT device and the gateway device;

sending a first authorization request to the authorization device of the user, wherein after receiving the first authorization request, the authorization device generates an authorization identification that passes an authentication of the identification information, wherein the first authorization request comprises the identification information, and the authorization identification corresponds to a payment account of the authorization device;

receiving the authorization identification from the authorization device;

sending a second authorization request to the server, wherein after receiving the second authorization request, the server stores and associates the identification information, a second device identification, and the payment account corresponding to the authorization identification, wherein the second authorization request comprises the identification information, the second device identification, and the authorization identification, wherein a registry is setup, by the server, containing association relationships of the identification information, the second device identification, and the authorization identification;

after a target IoT device of the user, being one of the at least one IoT device, generates a payment requirement for an online transaction, obtaining target identification information and payment amount of the target IoT device connected to the gateway device, wherein the target identification information comprises a first device identification of the target IOT device that uniquely represents an identity of the target IoT device, and a feature identification of a physical layer between the target IoT device and the gateway device that uniquely represents a communication link between the target IoT device and the gateway device, wherein different IoT devices connected to the gateway device are separately and uniquely identified for multi-user applications; and sending a first payment request to a server requesting to search the registry for a target payment account of the user associated with the target identification information and a second device identification of the gateway device, wherein the server deducts from the target payment account according to the payment amount to complete the online transaction for the user without the user providing a payment account number, and wherein the first payment request comprises the target identification information, the second device identification and the payment amount.

2. The method according to claim 1, wherein obtaining the target identification information and the payment amount of the target IoT device connected to the gateway device further comprises:

receiving a second payment request from the target IoT device, wherein the second payment request comprises the target identification information and the payment amount.

3. The method according to claim 1, wherein the target identification information comprises the feature identification, obtaining the target identification information and the payment amount of the target IoT device connected to the gateway device further comprises:

receiving a third payment request from the target IoT device, wherein the third payment request comprises only the payment amount;

in response to the third payment request, obtaining feature information of the physical layer between the target IoT device and the gateway device; and generating the feature identification according to the feature information instead of the target IoT device generating the feature identification.

4. The method according to claim 3, wherein the feature information comprises at least one of a channel feature, a radio frequency fingerprint and a radio frequency watermark.

5. A gateway device for online payment, comprising:

a processor, and a memory storing computer instructions, wherein the computer instructions, when executed by the processor, implement operations comprising:

obtaining identification information of at least one Internet of Things (IoT) device connected to the gateway device, wherein the identification information comprises a device identification of the at least one IoT device, a feature identification of a physical layer between the at least one IoT device and the gateway device, or the device identification of the at least one IoT device and the feature identification of the physical layer between the at least one IoT device and the gateway device;

sending a first authorization request to an authorization device of a user, wherein after receiving the first authorization request, the authorization device generates an authorization identification that passes an authentication of the identification information, wherein the first authorization request comprises the identification information, and the authorization identification corresponds to a payment account of the authorization device;

receiving the authorization identification from the authorization device;

sending a second authorization request to a server, wherein after receiving the second authorization request, the server stores and associates the identification information, a second device identification, and the payment account corresponding to the authorization identification, wherein the second authorization request comprises the identification information, the second device identification, and the authorization identification, wherein a registry is setup, by the server, containing association relationships of the identification information, the second device identification, and the authorization identification;

after a target IoT device of the user, being one of the at least one IoT device, generates a payment requirement for an online transaction, obtaining target identification information and payment amount of the target IoT device connected to the gateway device, wherein the target identification information comprises a first device identification of the target IoT device that uniquely represents an identity of the target IoT device, and a feature identification of a physical layer between the target IoT device and the gateway device that uniquely represents a communication link between the target IoT device and the gateway device, wherein different IoT devices connected to the gateway device are separately and uniquely identified for multi-user applications; and sending a first payment request to a server requesting to search the registry for a target payment account of the user associated with the target identification information and a second device identification of the gateway device, wherein the server deducts from the target payment account according to the payment amount to complete the online transaction for the user without the user providing a payment account number, and wherein the first payment request comprises the target identification information, the second device identification and the payment amount.

6. The gateway device according to claim 5, wherein obtaining the target identification information and the payment amount of the target IoT device connected to the gateway device comprises:

receiving a second payment request from the target IoT device, wherein the second payment request comprises the target identification information and the payment amount.

7. The gateway device according to claim 5, wherein the target identification information comprises the feature identification, obtaining the target identification information and the payment amount of the target IoT device connected to the gateway device comprises:

receiving a third payment request from the target IoT device, wherein the third payment request comprises only the payment amount;

in response to the third payment request, obtaining feature information of the physical layer between the target IoT device and the gateway device; and generating the feature identification according to the feature information.

8. The gateway device according to claim 7, wherein the feature information comprises at least one of a channel feature, a radio frequency fingerprint and a radio frequency watermark.

* * * * *